United States Patent
Ji et al.

(10) Patent No.: US 12,294,321 B2
(45) Date of Patent: May 6, 2025

(54) METHODS AND SYSTEM FOR ESTIMATING ELECTRIC MACHINE POSITION OFFSET

(71) Applicant: Ford Global Technologies, LLC, Dearborn, MI (US)

(72) Inventors: Yingfeng Ji, Northville, MI (US); Yang Xu, Canton, MI (US); Michael W. Degner, Novi, MI (US); Jiyao Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 18/046,046

(22) Filed: Oct. 12, 2022

(65) Prior Publication Data

US 2024/0128907 A1    Apr. 18, 2024

(51) Int. Cl.
*H02P 21/00* (2016.01)
*H02P 21/18* (2016.01)
*H02P 21/22* (2016.01)

(52) U.S. Cl.
CPC .............. *H02P 21/18* (2016.02); *H02P 21/22* (2016.02)

(58) Field of Classification Search
CPC ................................. H02P 21/18; H02P 21/22
USPC ..................................................... 318/400.02
See application file for complete search history.

(56) References Cited

U.S. PATENT DOCUMENTS

| | | | | |
|---|---|---|---|---|
| 2006/0055363 A1* | 3/2006 | Patel | ...................... | H02P 21/10 318/757 |
| 2008/0309265 A1* | 12/2008 | Terada | .................... | H02P 21/06 318/400.02 |
| 2020/0249054 A1 | 8/2020 | Sahhary et al. | | |
| 2021/0391812 A1 | 12/2021 | Kuruppu et al. | | |

FOREIGN PATENT DOCUMENTS

| CN | 108494307 B | 10/2021 |
|---|---|---|
| CN | 114257150 A | 3/2022 |

OTHER PUBLICATIONS

Choi, J., "Inverter Output Voltage Synthesis Using Novel Dead Time Compensation," IEEE Transactions on Power Electronics, vol. 11, No. 2, Mar. 1996, 7 pages.

Kim, H., "On-Line Parameter Estimation, Current Regulation, and Self-Sensing for IPM Synchronous Machine Drives," Doctor of Philosophy (Mechanical Engineering) Dissertation, University of Wisconsin—Madison, Feb. 2, 2004, 24 pages.

Kim, H. et al., "Nonlinearity Estimation and Compensation of PWM VSI for PMSM Under Resistance and Flux Linkage Uncertainty," IEEE Transactions on Control Systems Technology, vol. 14, No. 4, Jul. 2006, 13 pages.

* cited by examiner

*Primary Examiner* — Erick D Glass
(74) *Attorney, Agent, or Firm* — David Kelley; McCoy Russell LLP

(57) ABSTRACT

Systems and methods for operating an electric drive system for an electric or hybrid vehicle is described. In one example, the drive system is operated by suppling a pulsed torque current command while supplying a zero flux current command. The torque current command and the flux current command make up winding current commands for an electric machine.

20 Claims, 5 Drawing Sheets

METHODS AND SYSTEM FOR ESTIMATING ELECTRIC MACHINE POSITION OFFSET

FIELD

The present description relates to methods and a system for operating an electric machine. The electric machine may include permanent magnets.

BACKGROUND AND SUMMARY

Electric vehicles and hybrid vehicles include electric drive systems for propulsion. The electric drive systems may include an electric machine that operates as a motor to provide positive torque to a driveline. The electric machine may be a permanent magnet machine that includes a rotor and a stator. The permanent magnets are included in the rotor and the rotor rotates in response to a rotating magnetic field that is generated by electrical current that flows through windings of the stator. Maximum torque of the electric machine may be generated when the magnetic field that is generated by the stator windings is 900 apart from the magnet of the rotor. If the magnetic field of the stator windings is aligned with the magnet of the rotor, zero torque is generated and the rotor's magnet is pulled outward rather than generating a torque. Electric current flowing through the stator's coils may be decomposed into torque or quadrature current ($i_q$) that generates torque in the electric machine and direct or flux current ($i_d$) that tends to pull the rotor magnet in an outward direction. Accordingly, to generate maximum torque to rotate the rotor, it may be desirable for an electric machine controller to generate electric current flow in the stator windings in a way that maximizes quadrature current and reduces flux current.

The controller may adjust electric current flow in the stator's windings relative to rotor position to maximize torque current and reduce flux current. The rotor's position may be measured relative to the stator by a rotor sensor. A position offset angle for the electric machine may be defined as an angle between a zero reference of the stator and a zero reference of a rotor position sensor. The stator zero reference may be defined by placement of V-W phase windings of the stator and the rotor sensor zero reference may be a rotor position where the rotor sensor outputs a particular signal artifact (e.g., a pulse). The controller may adjust current flow to the stator windings according to the position offset angle. Therefore, it may be desirable to accurately determine the position offset angle. However, applying a voltage to a stator winding does not produce a corresponding electric current in the winding that is exactly in phase with the applied voltage. Rather, the current may lag the voltage causing the magnetic field that is generated by current flowing through the stator windings to lag. The amount of lag is not only a function of winding impedance, but the lag may also be a function of inverter deadtime (e.g., an amount of time that a transistor or switch in the inverter is delayed from opening so that a short circuit is not created within the inverter by simultaneously opening two series transistors). Therefore, it may be desirable to provide a way of estimating a position offset angle that reduces influence of inverter deadtime on the estimated position offset angle.

The inventors herein have recognized the above-mentioned issues and have developed a method for operating an electric drive system, comprising: via a controller, generating a pulsed torque current command and a zero flux current command, and operating the electric drive system via the pulsed torque current command and the zero flux current command, where the pulsed torque current command and the zero flux current command generate currents flowing through windings of the electric drive system; and estimating an estimated offset angle between an electric machine rotor reference position and an electric machine position sensor reference position responsive to data generated while operating the electric drive system according to the pulsed torque current command and the zero flux current command.

By commanding a torque current via a square wave signal (e.g., a signal that moves between two different values without moving to intermediate values between the two values) while commanding a flux current to zero, it may be possible to reduce the influence that deadtime of an inverter has on estimation of an electric machine position offset. In particular, a pulsating torque current command comprising a zero-average current, a pre-defined amplitude, and a pre-defined frequency along with a zero flux current command may overcome the influence of the deadtime of the inverter on inverter voltage output and the estimation of position offset.

The present description may provide several advantages. In particular, the approach may provide more accurate estimates of an electric machine position offset. Further, the approach may provide more accurate estimates of electric machine position offset without the expense of additional hardware. In addition, the electric machine position offsets may be generated while a vehicle in which an electric machine provides propulsive torque is operated.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
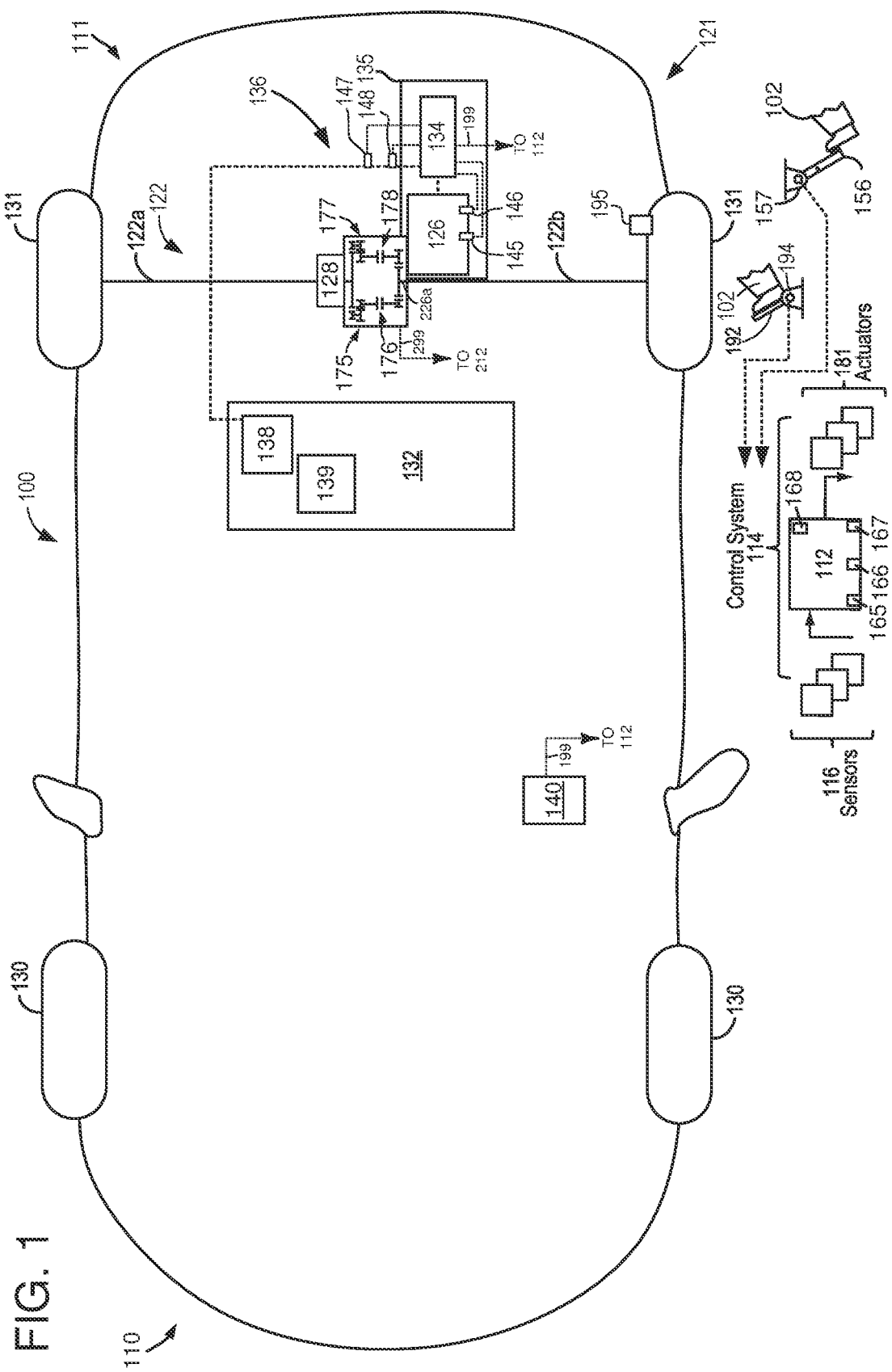
FIG. 1 is a schematic diagram of a vehicle that includes an electric machine for propulsion.
Figure 2A:
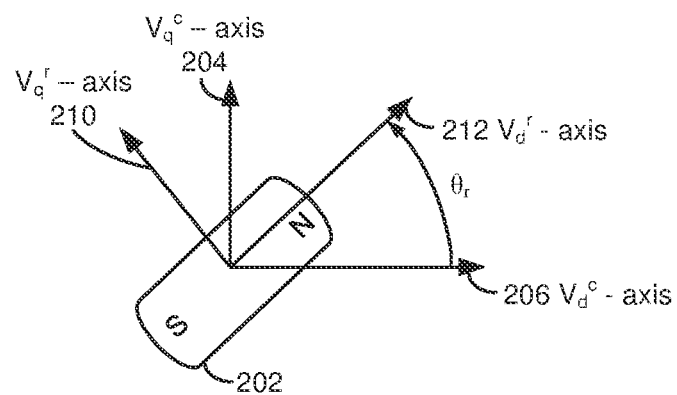
FIG. 2A is a schematic diagram of a controller vector reference frame and an electric machine rotor reference frame.
Figure 2B:
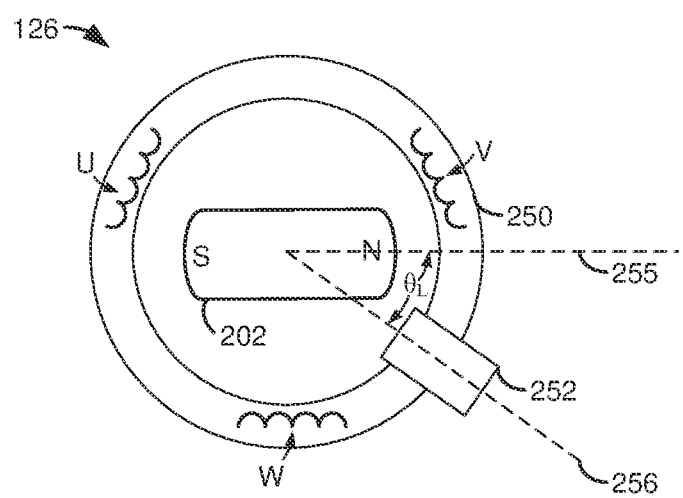
FIG. 2B is a schematic diagram of an example electric machine and rotor sensor.
Figure 3:
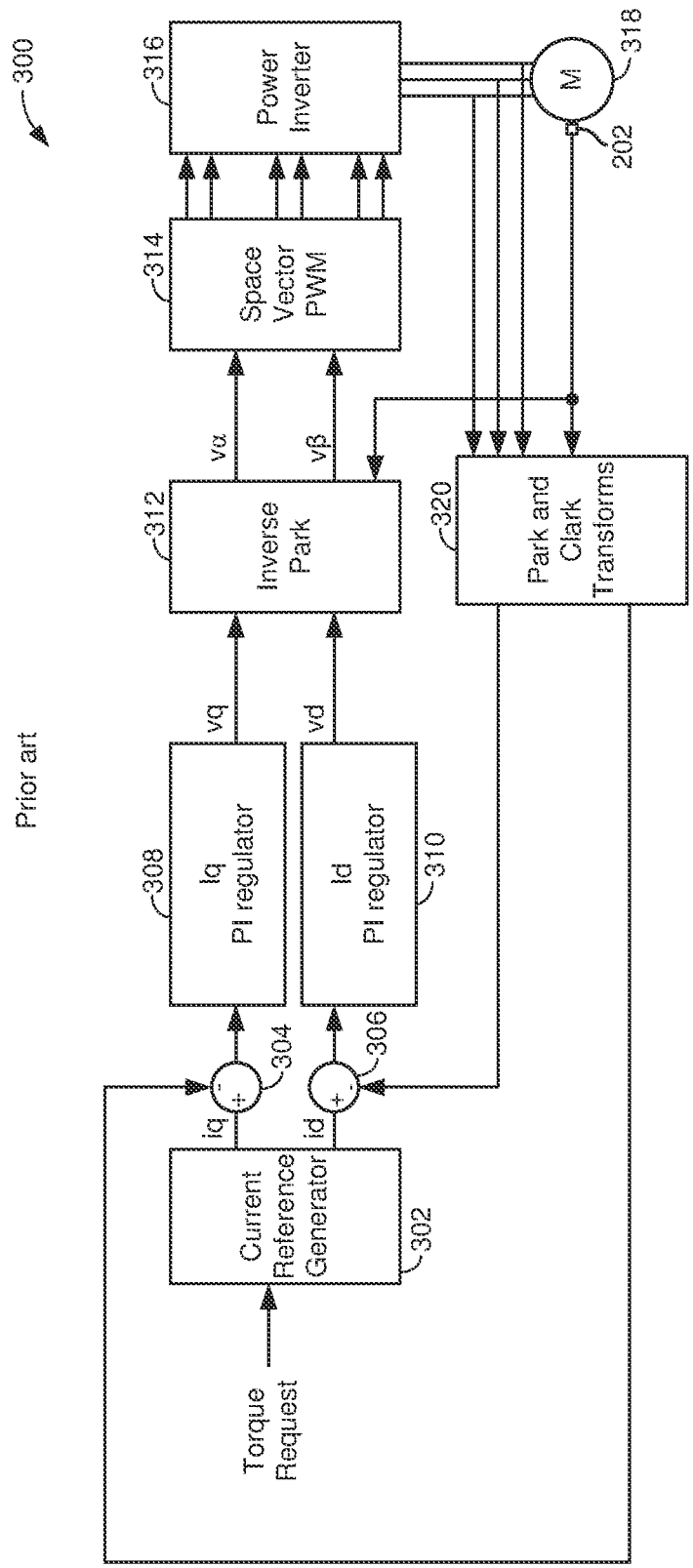
FIG. 3 is a block diagram of a prior art space vector pulse width modulation motor control.
Figure 4:
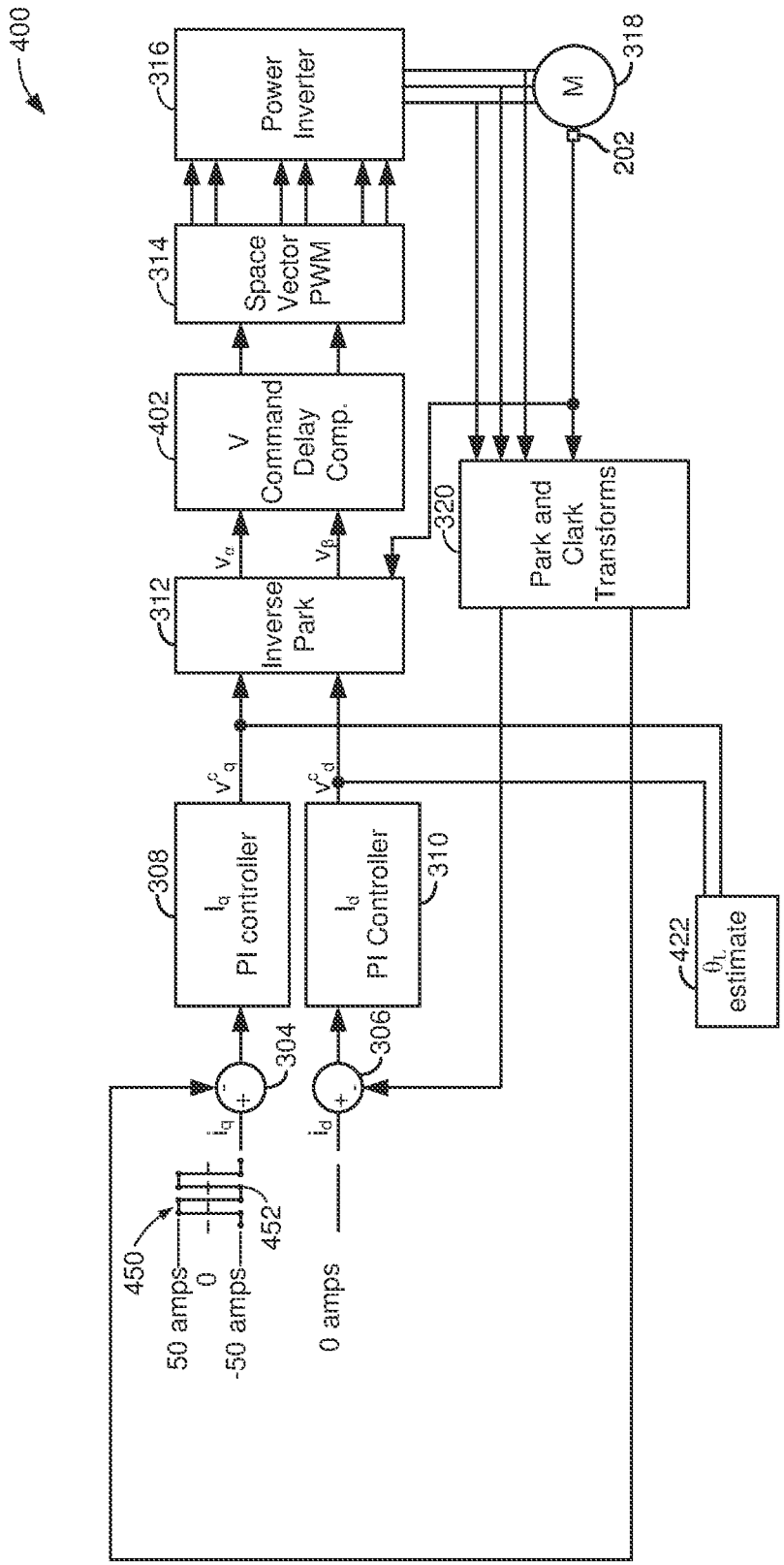
FIG. 4 is a block diagram for estimating an offset angle in a space vector pulse width modulation motor control system.
Figure 5:
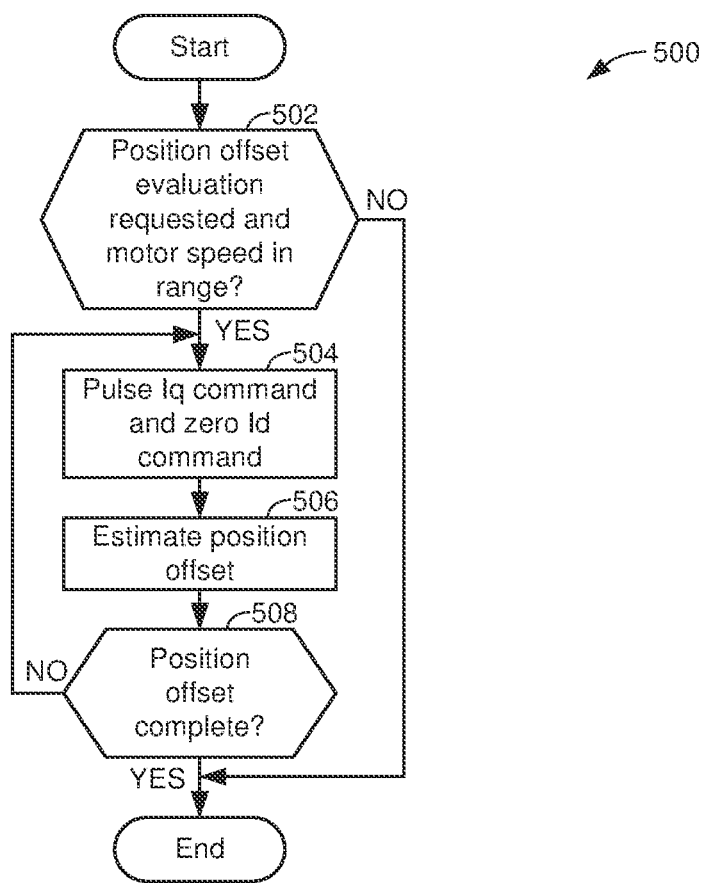
FIG. 5 is a flowchart of a method for estimating an offset angle of a space vector pulse width modulation motor control system.

The present description is related to estimating a position offset of an electric machine. The electric machine may be included in a drive system of a vehicle. The methods and systems described herein may permit a more accurate estimate of a position offset. In one example, the method includes commanding a space vector pulse width modulated drive with a pulsed current command (e.g., a square wave) and a zero current command. The pulsed or square wave current command may be fed into a torque current input of the space vector pulse width modulated drive and the zero current command may be fed into a flux current input. The pulsed current and the zero current commands operate to cause the electric machine rotor to rotate relative to the electric machine stator. The electric machine position offset estimate is generated in response to voltages generated by the space vector pulse width modulated drive. The position offset estimate may be subsequently applied to control the electric machine. A vehicle that includes a space vector pulse width modulated drive system and electric machine is shown in FIG. 1. Two references axes for an electric machine are shown in FIG. 2A. An example permanent magnet electric machine is shown in FIG. 2B. FIG. 3 shows a block diagram of a prior art space vector pulse width modulated drive system. FIG. 4 shows a block diagram of a system for estimating the position offset of an electric machine. FIG. 5 is a block diagram of a method for estimating the position offset of an electric machine.

FIG. 1 is a block diagram of a vehicle 121 including a powertrain or driveline 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout the description of FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122a, and second half shaft 122b. Vehicle propulsion system 100 further has front wheels 130 and rear wheels 131. Rear wheels 231 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126a of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122a and to second half shaft 122b. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from pedal position sensor 194 which communicates with pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199.

Referring now to FIG. 2A, an example plot that illustrates a two different reference frames for an electric machine is shown. The first reference frame is a controller reference frame that includes a torque voltage $v_q^c$ and a flux voltage $v_d^c$ that may be combined to form a command voltage in the controller reference frame. The controller referenced torque voltage axis is indicated at 204 and it is a function of a position of a stator (not shown) of the electric machine. The controller referenced flux voltage axis is indicated at 206 and it is also a function of stator position. The second reference frame is a rotor reference frame that includes a torque voltage $v_q^r$ and a flux voltage $v_d^r$ that may be combined to form a command voltage in the rotor reference frame. The rotor torque voltage axis is indicated at 210 and it is a function of a position of rotor 202 which rotates within a stator (not shown). The rotor flux voltage axis is indicated at 212 and it is also a function of a position of rotor 202.

The controller reference frame is stationary while the rotor reference frame rotates as the electric machine's rotor rotates. The electric machine position offset angle is indicated by $\theta_r$ and $\theta_L$ converges to $\theta_r$. The relationship between the controller reference frame and the rotor reference frame may be described via the following equations:

$$\begin{bmatrix} V_d^r \\ V_q^r \end{bmatrix} = \begin{bmatrix} \cos(\theta_r) & \sin(\theta_r) \\ -\sin(\theta_r) & \cos(\theta_r) \end{bmatrix} \begin{bmatrix} V_d^c \\ V_q^c \end{bmatrix} \quad \text{Eq. 1}$$

where $\theta_r$ is the position offset angle between the controller reference frame and the rotor reference frame and the other variables are as previously described.

Referring now to FIG. 2B, a schematic diagram of an example electric machine including a rotor sensor is shown. In this example, rotor 202 is configured to rotate within stator 250. Stator 250 is configured with three windings (U, V, W) arranged at 120 degree intervals to form a three phase electric machine. Rotor position sensor 252 is configured to sense a position of rotor 202 as rotor 202 rotates within stator 250. In this example, a position offset angle $\theta_r$ for the electric machine 126 may be defined as an angle between a zero reference of the stator and a zero reference of a rotor position sensor. In this example, the zero reference of the rotor is indicated by line 255 and the zero reference of the sensor is indicated by line 256.

Referring now to FIG. 3, a block diagram of a prior art space vector pulse width modulation motor controller 300 is shown. The space vector pulse width modulation motor controller 300 includes electric machine 126. In this example, electric machine 126 is a three phase electric machine that is supplied with electric power via power inverter 316. The amounts of electric current that are supplied in each of the three phases is input to block 320 where Park and Clark transforms convert the electric currents from each of the three phases into a measured torque current $i_q$ and a measured flux current $i_d$. The measured flux current $i_d$ is subtracted from the commanded flux current is at junction 306 (e.g., summing junction). The measured torque current $i_q$ is subtracted from the commanded torque current $i_q$ at junction 304 (e.g., summing junction). An electric machine torque request is input to current reference generator 302 and current reference generator 302 decomposes the electric machine torque request and outputs a commanded flux current $i_d$ and a commanded torque current $i_q$ to generate the requested electric machine torque.

A torque current proportional/integral controller 308 receives a torque current error from junction 304 and outputs a torque voltage $v_q$ command. Similarly, a flux current proportional/integral controller 310 receives a flux current error from junction 306 and outputs a flux voltage $v_d$ command. The torque voltage $v_q$ command and the flux voltage command $v_d$ are processed via an inverse Park transform into a torque voltage in a rotating reference frame $v_d$ and a flux voltage in the rotating reference frame $v_\beta$. At block 314, the torque voltage in the rotating reference frame $v_\alpha$ and the flux voltage in the rotating reference frame $v_\beta$ are converted into phase pulses via space vector pulse width modulation. The pulses operate the transistors or switches in the power inverter 316. The power inverter 316 outputs voltages for each of the phase windings of electric machine 126. The position of electric machine 126 is converted into an angle and the angle is supplied to blocks 312 and 320 for the inverse Park transform and the Park and Clark transforms.

Thus, a torque request is converted into two electric current commands and the two electric current commands are converted into pulses. The pulses control the voltage that is supplied to electric machine 126.

Referring now to FIG. 4, a block diagram of a system for estimating a position offset angle for an electric machine is shown. The block diagram of FIG. 4 is similar to the block diagram of FIG. 3, and blocks in FIG. 4 that are numbered the same as blocks in FIG. 3 provide the same functions that the similarly number blocks in FIG. 3 provide. However, the block diagram of FIG. 4 does not include a current reference generator, but it includes a block for estimating the position offset angle $\theta_L$.

In order to provide a more accurate position offset angle estimate for the electric machine, a pulsed torque current command 450 is input to junction 304. The pulsed torque current may be generated by a series of individual torque current ($i_q$) command values as indicated by points or dots 452. The individual torque current values may change from a first value (e.g., 50 amperes) to a second value (e.g., −50 amperes) as shown in pulsed torque current command 450 without any intermediate torque current command values between the two values. The individual torque current values may also change from the second value (e.g., −50 amperes) to the first value (e.g., 50 amperes) as shown in pulsed torque current command 450 without any intermediate torque current command values between the two values. By changing from the first torque current value to the second current torque value without intermediate torque current demands, a square wave or pulsed torque current command is generated and input to junction 304 where the measured torque current is subtracted from the commanded torque current. The frequency and the duty cycle of the torque current values may be adjusted by controlling the duration that the individual torque current is maintained at the first value and/or the second value. Thus, several individual torque command values of equal value may be output in a sequential series without outputting a different individual torque command value to control the amount of time that the pulsed torque current remains at a high or low value. The frequency and the duty cycle (e.g., the percentage of time that the torque current command is at a larger value relative to the period of the torque current command) of the torque current command may be adjusted according to vehicle speed to maintain vehicle speed while the position offset angle for the electric machine is estimated. The flux current command ($i_d$) is commanded to zero. By commanding the torque current via a pulsed command and the flux current to zero, the estimate of the electric machine position offset angle may be made more accurate because the effect of inverter deadtime can be eliminated by the pre-defined pulsating current command.

Blocks 308-316 perform the same operations as blocks 308-316 in FIG. 3. Block 402 provides voltage command delay compensation and the voltage delay compensation may be performed according to the following equation, where $\theta_{delay}$ is the delayed angle.

$$v_{\alpha new} = v_\alpha \cos(\theta \text{delay}) + v_\beta \sin(\theta \text{delay}) \qquad \text{Eq. 2}$$

$$v_{\beta new} = -v_\alpha \sin(\theta \text{delay}) + v_\beta \cos(\theta \text{delay}) \qquad \text{Eq. 3}$$

At block 422, the position offset angle for the electric machine is estimated. The estimated rotor reference frame voltages may be determined via the following equation:

$$\begin{bmatrix} v_d^r \\ v_q^r \end{bmatrix} = \begin{bmatrix} r_s & -\omega_r L_q \\ \omega_r L_d & r_s \end{bmatrix} \begin{bmatrix} i_d^r \\ i_q^r \end{bmatrix} + \frac{d}{dt}\begin{bmatrix} L_d & 0 \\ 0 & L_q \end{bmatrix} \begin{bmatrix} i_d^r \\ i_q^r \end{bmatrix} + \begin{bmatrix} 0 \\ \omega_r \lambda_{PM} \end{bmatrix} \qquad \text{Eq. 4}$$

where $v_d^r$ is the flux rotor reference frame voltage for the electric machine, $v_q^r$ is the torque rotor reference frame voltage, $r_s$ is the phase resistance of the electric machine (stored in controller memory), $\omega_r$ is the electric machine rotor speed (input to block 422), $L_q$ is the quadrature (torque) axis inductance (stored in controller memory), $L_d$ is the direct (flux) axis inductance (stored in controller memory), $i_d^r$ is the flux rotor reference frame current for the electric machine, $i_q^r$ is the torque rotor reference frame current for the electric machine, and $\lambda_{PM}$ is the flux linkage of the electric machine.

The electric machine in the synchronous or rotating frame may be transferred to the controller frame as previously mentioned via:

$$\begin{bmatrix} v_d^r \\ v_q^r \end{bmatrix} = \begin{bmatrix} \cos(\theta_r) & \sin(\theta_r) \\ -\sin(\theta_r) & \cos(\theta_r) \end{bmatrix} \begin{bmatrix} v_d^c \\ v_q^c \end{bmatrix}$$

where $\theta_r$ is the position offset angle for the electric machine in the rotating frame, where $v_d^c$ is flux voltage in the controller frame, and where $v_q^c$ is torque voltage in the controller frame. The electric machine model in the controller frame may be determined via the following equation:

$$\begin{bmatrix} v_d^c \\ v_q^c \end{bmatrix} = \begin{bmatrix} (L_q - L_d)\omega_r \sin(2\theta) + r_s & -\frac{L_q + L_d}{2}\omega_r - \frac{L_q - L_d}{2}\omega_r\cos(2\theta_r) + L_q\sin^2(\theta_r) + L_d\cos^2(\theta_r) \\ \frac{L_q + L_d}{2}\omega_r - \frac{L_q - L_d}{2}\omega_r\cos(2\theta_r) - L_q\cos^2(\theta_r) - L_d\sin^2(\theta_r) & -(L_q - L_d)\omega_r\sin(2\theta_r) + r_s \end{bmatrix} \begin{bmatrix} i_d^c \\ i_q^c \end{bmatrix} + \begin{bmatrix} L_q\sin^2(\theta_r) + L_d\cos^2(\theta_r) & -\frac{L_q + L_d}{2}\sin(2\theta_r) \\ -\frac{L_q + L_d}{2}\sin(2\theta_r) & L_q\cos^2(\theta_r) + L_d\sin^2(\theta_r) \end{bmatrix} \frac{d}{dt}\begin{bmatrix} i_d^c \\ i_q^c \end{bmatrix} + \begin{bmatrix} -\omega_r\lambda_{PM}\sin(\theta_r) \\ \omega_r\lambda_{PM}\cos(\theta_r) \end{bmatrix} \qquad \text{Eq. 5}$$

Equation 5 may be simplified to the following equations when the average value of $i_d^c$ and $i_q^c$ are equal to zero:

$$v_d^c = -\omega_r \lambda_{PM} \sin(\theta_r) \quad \text{Eq. 6}$$

$$v_q^c = \omega_r \lambda_{PM} \cos(\theta_r) \quad \text{Eq. 7}$$

The voltages $v_d^c$ and $v_q^c$ may be projected on the d axis such that the voltage of the d axis may be determined via the following equation:

$$v_d^c = v_d^c \cos(\theta L) - v_q^c \sin(\theta_L) \quad \text{Eq. 8}$$

The estimated position offset angle for the electric machine $\theta_L$ (e.g., the learned value of $\theta_r$) may be determined via iteratively solving a proportional/integral controller as described by the following equation:

$$\theta_L = k_p(v_{dref} - (v_d^c \cos(\theta L) - v_q^c \sin(\theta L))) + k_i \int (v_{dref} - (v_d^c \cos(\theta_L) - (v_q^c \sin(\theta L)))dt \quad \text{Eq. 9}$$

where $\theta_L$ is the estimated position offset for the electric machine, $k_p$ is a proportional gain (e.g., scalar real number), $v_{dref}$ is a d axis reference voltage, and $k_i$ is the integral gain (e.g., scalar real number). The value of $\theta_L$ is stored in controller memory.

The system of FIGS. 1, 2, and 4 provides for a system, comprising: an electric drive system including an inverter and an electric machine; and a controller including executable instructions stored in non-transitory memory that cause the controller to generate a torque current command that is comprised of a first group of values and a second group of values, generate a flux current command that is zero while the torque current command oscillates between the first group of values and the second group of values, operate the electric machine based on the torque current command and the flux current command, and where the torque current and the flux current make up currents flowing through windings of the electric machine. In a first example, the system includes where the electric machine includes one or more permanent magnets. In a second example that may include the first example, the system includes where the electric machine is a three-phase electric machine. In a third example that may include one or both of the first and second examples, the system includes where the first group of values includes positive values and no negative values. In a fourth example that may include on or more of the first through third examples, the system includes where the second group of values includes negative values and no positive values. In a fifth example that may include one or more of the first through fourth examples, the system includes where the torque current command changes between the first group of values and the second group of values. In a sixth example that may include one or more if the first through fifth examples, the system further comprises additional instructions to adjust the torque current command between the first group of values and the second group of values.

Referring to FIG. 5, a flowchart of a method for estimating a position offset for an electric machine is shown. The method of FIG. 5 may be at least partially implemented as executable instructions stored in controller memory in the systems of FIGS. 1, 2, and 4. Further, the method of FIG. 5 may include actions taken in the physical world to transform operating states of the system of FIGS. 1, 2A, 2B, and 4. In addition, in some examples, the method of FIG. 5 may be distributed amongst several controllers where each controller performs a portion of the method.

At 502, method 500 judges whether or not an electric machine position offset angle is requested and if a rotational speed of the electric machine is in a predetermined range. The predetermined range may be a function of vehicle speed and additional conditions may be evaluated to determine whether or not the electric machine position offset angle may be estimated. For example, method 500 may require that the vehicle speed be in a predetermined range and that the driver demand torque be within a predetermined range. The driver demand torque may be determined from a position of a driver demand pedal. By requiring that the vehicle speed be in a predetermined range and the driver demand torque be in a predetermined range, method 500 may operate to keep vehicle operating conditions substantially constant (e.g., varying by less than ±5% of request), it may be possible to perform method 500 with little effect on vehicle operation so that vehicle occupants may not be disturbed and so that an accurate electric machine position offset angle may be determined. If method 500 judges that an electric machine position offset estimate is requested and rotational speed of the electric machine is within a specified range, the answer is yes and method 500 proceeds to 504. Otherwise, the answer is no and method 500 proceeds to exit.

At 504, method 500 issues a pulsing electric machine torque current ($i_q$) command. The pulsing electric machine current command may be provided at a fixed amplitude and frequency. In addition, the pulsing electric machine current command may be centered about zero current and it may oscillate between a first positive value and a second negative value. The electric machine torque current command may be in the form of a pulse train as shown at 450 of FIG. 4. The pulse train may be configured via a series of individual current commands. The series of individual current commands may be comprised of a group of current commands of a first value and a group of current commands of a second value. The pulse train may not include current commands other than those having the first value or the second value. The period of the pulse train may be based on vehicle speed or a requested electric machine speed. The duty cycle of the second value may be based on driver demand torque and/or a mechanical load that is applied to the electric machine. The pulse train may have an average value of zero. Method 500 adjusts the flux current ($i_d$) command to a constant value of zero. Method 500 proceeds to 506.

At 506, method 500 estimates the electric machine position offset angle. In one example, the electric machine position offset angle may be estimated as described for block 422 of FIG. 4. Once the electric machine position offset angle is determined, it may be stored in controller memory (e.g., RAM) and it may then be applied to adjust current that is applied to the stator windings so that electric machine torque and speed may be efficiently controlled. The electric machine position offset angle may be iteratively determined over a plurality of electric machine revolutions. Method 500 proceeds to 508.

At 508, method 500 judges whether or not the electric machine position offset angle determination is complete. In one example, method 500 may judge that the determination of the electric machine position offset angle determination is complete when the electric machine position offset angle changes by less than a threshold amount during a threshold duration (e.g., less than 0.25 rotor degrees in one minute. Thus, method 500 may determine that the electric machine position offset angle has converged to a final value based on a rate of change in the electric machine position offset angle. If method 500 judges that determination of the electric machine offset is complete, the answer is yes and method 500 proceeds to exit. Otherwise, the answer is no and method 500 returns to 504.

Thus, method 500 estimates an electric machine position offset angle in the presence of a pulsed torque current command while a flux current command is zero. Once the electric position offset angle is determined, it may be stored in controller memory for subsequent control of a magnetic field generated via stator windings of the electric machine.

The method of FIG. 5 provides for a method for operating an electric drive system, comprising: via a controller, generating a pulsed torque current command and a zero flux current command, and operating the electric drive system via the pulsed torque current command and the zero flux current command, where the pulsed torque current command and the zero flux current command make up currents flowing through windings of the electric drive system; and estimating an estimated offset angle between an electric machine rotor reference position and an electric machine position sensor reference position responsive to data generated (e.g., volt values (commands and measured values) and current values (commands and measured values) while operating the electric drive system according to the pulsed torque current command and the zero flux current command. In a first example, the method includes where the pulsed torque current command includes a fixed amplitude and a fixed frequency. In a second example that may include the first example, the method includes where the pulsed torque current command oscillates between a negative current and a positive current. In a third example that may include one or both if the first and second examples, the method includes where the pulsed torque current command is centered about zero current. In a fourth example that may include one or more of the first through third examples, the method includes where the pulsed torque current command is in the form of a square wave that changes from a first value to a second value without being commanded to values between the first value and the second value. In a fifth example that may include one or more of the first through fourth examples, the method includes where the square wave changes from the second value to the first value without being commanded to values between the first value and the second value. In a sixth example that may include one or more of the first through fifth examples, the method includes where the electric drive system is comprised of an electric machine and a power inverter. In a seventh example that may include one or more of the first through sixth examples, the method includes where operating the electric drive system includes rotating the electric machine.

The method of FIG. 5 also provides for a method for operating an electric drive system, comprising: via a controller, generating a pulsed torque current command and a zero flux current command, and operating the electric drive system via the pulsed torque current command and the zero flux current command, where the pulsed torque current command and the zero flux current command make up currents flowing through windings of the electric drive system; and estimating an estimated offset angle between an electric machine rotor reference position and an electric machine position sensor reference position responsive to data generated while operating the electric drive system according to the pulsed torque current command and the zero flux current command, where the data includes a controller reference frame flux voltage and a controller reference frame torque voltage. In a first example, the method includes where the controller reference frame flux voltage is multiplied by a cosine of the estimated offset angle. In a second example that may include the first example, the method includes where the controller reference frame torque voltage is multiplied by a sine of the estimated offset angle. In a third example that may include one or both of the first and second examples, the method further comprises storing the estimated offset angle to controller memory. In a fourth example that may include one or more of the first through third examples, the method includes where the estimated offset angle is estimated via a proportionate gain and an integral gain.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
via a controller, generating a pulsed torque current command and a zero flux current command, and operating the electric drive system via the pulsed torque current command and the zero flux current command, where the pulsed torque current command and the zero flux current command generate currents flowing through windings of the electric drive system; and
estimating an estimated offset angle between an electric machine rotor reference position and an electric machine position sensor reference position responsive to data generated while operating the electric drive system according to the pulsed torque current command and the zero flux current command.

2. The method of claim 1, where the pulsed torque current command includes a fixed amplitude and a fixed frequency.

3. The method of claim 2, where the pulsed torque current command oscillates between a negative current and a positive current.

4. The method of claim 3, where the pulsed torque current command is centered about zero current.

5. The method of claim 1, where the pulsed torque current command is in a form of a square wave that changes from a first value to a second value without being commanded to values between the first value and the second value.

6. The method of claim 5, where the square wave changes from the second value to the first value without being commanded to values between the first value and the second value.

7. The method of claim 1, where the electric drive system is comprised of an electric machine and a power inverter.

8. The method of claim 7, where operating the electric drive system includes rotating the electric machine.

9. A system, comprising:
an electric drive system including an inverter and an electric machine; and
a controller including executable instructions stored in non-transitory memory that cause the controller to generate a torque current command that is comprised of a first group of values and a second group of values, generate a flux current command that is zero while the torque current command oscillates between the first group of values and the second group of values, operate the electric machine based on the torque current command and the flux current command, and where the torque current command and the flux current command generate electric currents flowing through windings of the electric machine.

10. The system of claim 9, where the electric machine includes one or more permanent magnets.

11. The system of claim 10, where the electric machine is a three-phase electric machine.

12. The system of claim 9, where the first group of values includes positive values and no negative values.

13. The system of claim 12, where the second group of values includes negative values and no positive values.

14. The system of claim 13, where the torque current command changes between the first group of values and the second group of values.

15. The system of claim 14, further comprising additional instructions to adjust the torque current command between the first group of values and the second group of values.

16. A method for operating an electric drive system, comprising:
via a controller, generating a pulsed torque current command and a zero flux current command, and operating the electric drive system via the pulsed torque current command and the zero flux current command, where the pulsed torque current command and the zero flux current command make up currents flowing through windings of the electric drive system; and
estimating an estimated offset angle between an electric machine rotor reference position and an electric machine position sensor reference position responsive to data generated while operating the electric drive system according to the pulsed torque current command and the zero flux current command, where the data includes a controller reference frame flux voltage and a controller reference frame torque voltage.

17. The method of claim 16, where the controller reference frame flux voltage is multiplied by a cosine of the estimated offset angle.

18. The method of claim 17, where the controller reference frame torque voltage is multiplied by a sine of the estimated offset angle.

19. The method of claim 18, further comprising storing the estimated offset angle to controller memory.

20. The method of claim 16, where the estimated offset angle is estimated via a proportionate gain and an integral gain.

* * * * *